March 5, 1957 M. CAMRAS 2,784,259

RECORDING AND ERASE HEAD FOR MAGNETIC RECORDERS

Filed Dec. 17, 1952 3 Sheets-Sheet 1

Inventor
Marvin Camras
by Hill Sherman Meroni Gross & Simpson
Attys

March 5, 1957 M. CAMRAS 2,784,259

RECORDING AND ERASE HEAD FOR MAGNETIC RECORDERS

Filed Dec. 17, 1952 3 Sheets-Sheet 2

Inventor
Marvin Camras
by Hill Sherman Meroni Gross & Simpson
Attys

RECORDING AND ERASE HEAD FOR MAGNETIC RECORDERS

Filed Dec. 17, 1952

3 Sheets-Sheet 3

Inventor
Marvin Camras
by Hill Sherman Meroni Gross & Simpson
Attys

United States Patent Office 2,784,259

Patented Mar. 5, 1957

2,784,259

RECORDING AND ERASE HEAD FOR MAGNETIC RECORDERS

Marvin Camras, Chicago, Ill., assignor to Armour Research Foundation of Illinois Institute of Technology, Chicago, Ill., a corporation of Illinois Application December 17, 1952, Serial No. 326,520

24 Claims. (Cl. 179—100.2)

This invention relates to improvements in a recording and erase head for magnetic recorders, and more particularly to a head for association with an elongated record medium, such as a tape or wire, to de-magnetize the record medium, to place a record upon the medium by magnetizing in accordance with impulses to be recorded, or as a pickup element for reproducing a record already upon the medium, although the invention may have other uses and purposes as will be apparent to one skilled in the art.

This application is a continuation-in-part of my co-pending application entitled "Recording and Erase Head for Magnetic Recorders," filed July 8, 1948, Serial No. 37,676, now abandoned which last mentioned application is in turn a continuation-in-part of my application entitled "Demagnetizing Means and Method for Magnetic Recorder," filed January 7, 1944, Serial No. 517,310, now abandoned.

In the use of magnetic recorders, it is frequently necessary to place a new recording upon a medium already magnetized in accordance with a previous recording. When that is done, an erasing or de-magnetizing head is employed to clean the wire before the new recording is placed upon it. In cleaning the medium, it has been customary to either de-magnetize the medium or else to magnetize the medium uniformly prior to the placing of the new recording upon the medium. In many cases, especially for rather high fidelity work, it is desirable to use a clean medium rather than one which is uniformly magnetized. Before the advent of this invention, difficulty was experienced in properly cleaning the medium of a previous recording especially in the smaller types of instruments, such as portable instruments, because of the difficulty of locating a source of alternating current, to say nothing of the source of alternating current of high frequency.

With the foregoing in mind, it is an important object of the instant invention to provide a head for a magnetic recorder which does not require high frequency current for its adequate operation.

Another object of the instant invention resides in the provision of a de-magnetizing head for a magnetic recorder or equivalent device so arranged that a recording medium is subjected to a zone of magnetization of progressively decreasing strength until the medium emerges in a substantially de-magnetized condition.

Still another object of this invention is the provision of a de-magnetizing head for a magnetic recorder which functions effectively to de-magnetize the recording medium, while the head may require no source of electrical power, may operate on direct current, or may operate on alternating current of common frequency.

It is also a feature of this invention to provide a D. C. magnetizing head for a magnetic recorder or similar device, which head embodies a plurality of magnetic poles interdigitated with a series of magnetic poles of opposite polarity, or disposed so that a pole on one side is opposite the space between a pair of poles on the opposite side, and the structure being arranged so that a recording medium passing in effective proximity to such pole pieces is subjected to a progressively decreasing magnetizing effect from the fields set up by the pole pieces.

It is a further object and feature of the present invention to provide a simple structure that sets up a succession of spaced fields, each in a direction substantially opposite to the preceding field.

It is a still further object of this invention to provide a head for a magnetic recording device which may be utilized either as an erasing head, or as a recording or reproducing head without change in structure.

Still a further feature of the invention resides in the provision of a head for a magnetic recorder having pole pieces arranged in spaced but overlapping relationshihp, such pole pieces being arranged to form a path of travel for a recording medium being acted upon by the head.

It is a still further feature of the instant invention to provide a head for a magnetic recorder having tapered overlapping but spaced pole pieces, joined to a common core so as to provide a complete magnetic return circuit, a coil being disposed in embracing relationship with a portion of the core to energize the same.

It is another feature to provide a path for supporting the record and holding it in a firm definite relation with respect to a group of pole pieces defining oppositely directed fields.

It is yet another feature of the invention to provide a head for a magnetic recorder having overlapping pole pieces wherein the overlapping portions define a triangular area for receiving the record medium over the base of the area.

It is another object of the present invention to provide a novel combined erase-record-playback head for a multi-channel tape.

It is still another object of the present invention to provide a novel head for a multi-channel tape provided with means for preventing cross-talk between the channels at the head.

While some of the more salient features, characteristics and advantages of the instant invention have been above pointed out, others will become apparent from the following disclosures, taken in conjunction with the accompanying drawings, in which.

As shown on the drawings.

Figure 1:
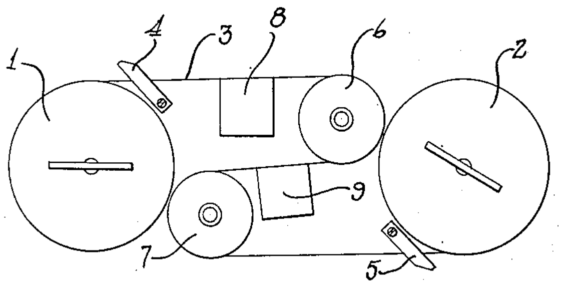
Figure 1 is a diagrammatic illustration of some of the salient mechanisms of a magnetic recording device including a pair of heads embodying the principles of the instant invention.

In the diagrammatic illustration of Figure 1, there is shown a general assembly of a magnetic recorder including a pair of spaced reels 1 and 2 which carry a recording medium in the nature of a relatively fine magnetizable wire 3 that may travel from spool 1 to spool 2 during a recording or reproducing operation, and which may travel from spool 2 to the spool 1 during a rewinding operation. Adjacent the spool 1 is a level winding arrangement 4, and a similar arrangement 5 may be disposed adjacent the spool 2, so as to maintain the wire uniformly wound upon the respective spools. During its travel from one spool to the other, the wire passes over a pair of spaced guide pulleys 6 and 7. Between the first spool and the guide pulley 6, a head 8 is disposed in proximity to the wire, and this head may be of the character shown in Figures 2 and 3, or of the character shown in Figures 5 and 6. Between the guide pulley 6 and the reel 2, in any desirable or suitable location, another head 9 may be disposed, and this head, which is the recording or reproducing head, may be of the character seen in Figures 5 and 6.

Obviously, during a reproduction or during a rewind operation, the erasing head 8 is rendered ineffective by any suitable means. Also, during a rewinding operation the head 9 is also rendered ineffective, and this head 9 may function either as a recording or reproducing head whenever desired.

Figure 2:
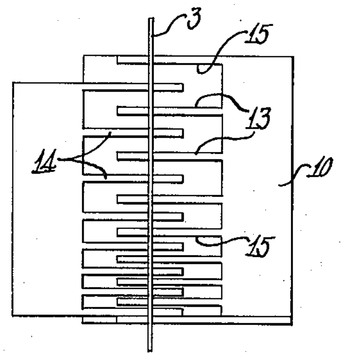
Figure 2 is an enlarged fragmentary top plan view of a de-magnetizing head suitable for use in the apparatus of Figure 1.
Figure 3:
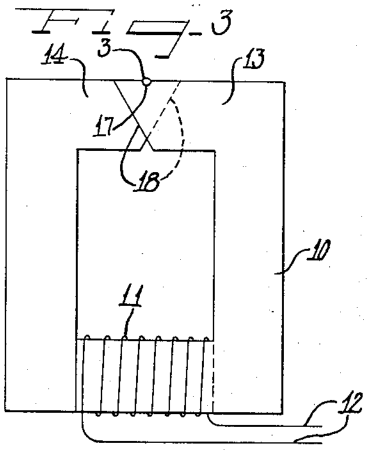
Figure 3 is a fragmentary end elevational view of the structure of Figure 2.

With reference now more particularly to Figures 2 and 3, it will be seen that one form of an erasing head embodying principles of the instant invention may include a magnetizable core 10, laminated or otherwise, and which may be energized by a coil 11 connected through leads 12 to any suitable source of current, in the event the core is not permanently magnetized. When the coil 11 is utilized, it may be energized either by direct current, or alternating current of relatively high or common frequency.

The core 10 is shaped to provide a plurality of poles 13 on one side thereof, and a similar plurality of poles 14 on the opposite side. It will be noted that the spaces 15 between the poles 13 gradually decrease from one end of the device to the other, while the spaces between the poles 14 on the opposite side decrease in the same proportion. It will also be noted from the showing in Figure 2, that the pole pieces 13 are in effect interdigitated with the pole pieces 14. That is, each pole 13 is disposed opposite a space between a pair of pole pieces 14, and a pole piece 14 is disposed opposite a space between a pair of pole pieces 13. The graduated spaces between the pole pieces, lessens the magnetic field between any pair of pole pieces of opposite polarity. Thus, when a recording medium, such as the wire 3, passes in proximity to the pole pieces, traveling in a direction from the closer spacing of the pole pieces to the wider spacing thereof, the medium is first subjected to a relatively strong magnetizing field, and the successive magnetizing fields progressively decrease in strength as well as alternate in direction, until finally the medium emerges from the entire head in a substantially de-magnetized condition. It is not essential that the two pole pieces 13 and 14 at one end are in face to face contact with each other as illustrated in Figure 2, but such a structure is entirely satisfactory. If the medium is spaced above the head, instead of riding in the groove, or if the spacing between pole pieces is narrow in relation to the diameter of the wire, it may move in the opposite direction with the same de-magnetizing result, as is obvious to one skilled in the art.

In order to define a path for the travel of the recording medium, the upper faces of the pole pieces are preferably grooved as indicated at 17 in Figure 3 so that the medium may follow along in that groove. It will also be noted from the showing in Figure 3 that each pole piece has a tapered end 18 so that the magnetic flux is concentrated adjacent the upper face of the respective pole piece to thereby be more effective upon the medium 3.

It should further be noted that the core 10 is so arranged as to provide a complete magnetic return circuit, a portion of which may be threaded through the coil 11, in the event a coil is used. Spacers of any suitable non-magnetic material may be utilized between the pole pieces, and also grooved as the pole pieces to define a better and more complete path for the medium, if so desired.

Figure 4:
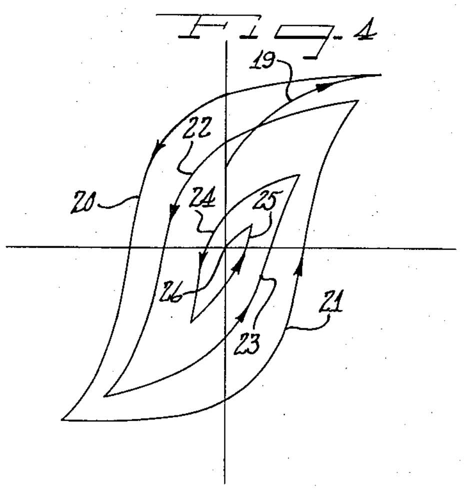
Figure 4 is a magnetization curve illustrating diagrammatically the decrease of magnetization of a recording medium subjected to the head of Figures 2 and 3.

In Figure 4 I have illustrated very diagrammatically a reduced form of curve indicating the demagnetization of the recording medium 3 by the head shown in Figures 2 and 3. This head, above described, acting upon the medium, will first set up a magnetization in one direction as exemplified by the curve portion 19 and then immediately sets up a substantially equal magnetization of the medium in the opposite direction as indicated by the curve portion 20. Following that, the medium is magnetized in its first direction as indicated at 21, then in the reverse direction as shown by the curve portion 22, again in a forward direction as at 23, in a reverse direction as at 24, in a forward direction as at 25, and in a reverse direction, until eventually zero magnetization exemplified by the point 26 is substantially reached. Each magnetization, forward or reverse, as indicated by the curve is to a lesser and lesser extent from the preceding magnetizations. The demagnetization of the medium follows this curve in general, whether the core 10 is in the form of a permanent magnet, whether it is energized through the coil 11 by direct current, or whether it is energized through the coil 11 by alternating current of either high or low frequency.

Figure 5:
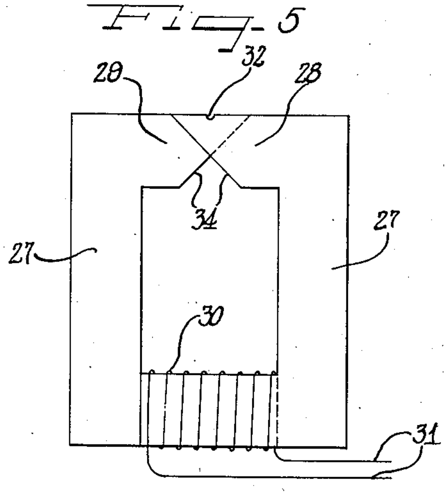
Figure 5 is a diagrammatic end elevational view of a head of slightly different form, also usable effectively in the general arrangement of Figure 1.
Figure 6:
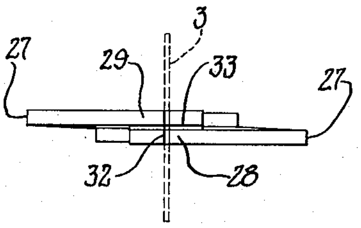
Figure 6 is a top plan view of the structure of Figure 5.
Figure 7:
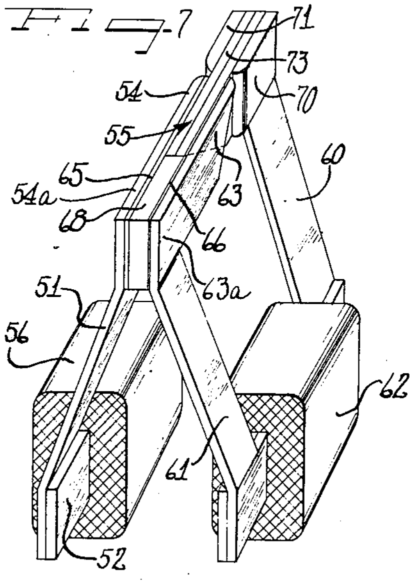
Figure 7 is an end perspective view of a combined erase-record-playback head suitable for use with a multi-channel tape.
Figure 8:
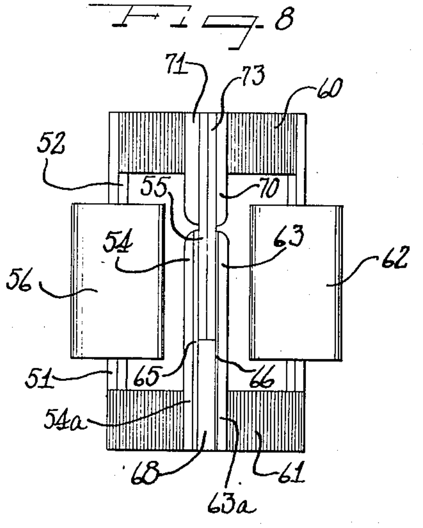
Figure 8 is a top plan view of the head for Figure 7.

In Figures 5 and 6 I have illustrated a slightly different form of head, and this head may be utilized either as an erasing head or a recording or reproducing head. In this instance, the head structure is simplified to a greater extent and comprises a core 27, laminated or otherwise, and embodies only a pair of pole pieces 28 and 29 in overlapping but spaced relationship. Obviously these pole pieces are of opposite polarity. A coil 30 may be disposed around a leg of the core 27 to energize the same, and from this coil leads 31 may reach to any suitable source of electrical energy, as a high frequency alternating current source or a direct current source to effect erasing operations or an audio frequency current source feeding signals to be recorded.

The upper faces of the pole pieces 28 and 29 are preferably disposed in the same horizontal plane, and each of these pole pieces is provided with a groove 32 so that a path for the recording medium, indicated in dotted lines in Figure 6, is established. Between the pole pieces (Figure 6) a spacer element 33 of non-magnetic material and similarly grooved may be utilized if desired.

With reference more particularly to Figure 5, it will be noted that each pole piece is provided with a tapered end 34 to concentrate the flux adjacent the upper face of the respective pole piece.

The tapering portions of the pole pieces are preferably overlapped substantially at the midpoint of the tapers in the direction of travel of the medium.

As the medium passes across the pole pieces, it will be affected by a field of lesser strength as it approaches the pole piece 29, then affected in the opposite direction by a field of greater strength between the pole pieces, and then affected by a field of lesser strength in the opposite direction from the middle and stronger field as it leaves the pole piece 28. Thus, it is demagnetized to a satisfactory extent.

When the head is utilized as a recording head, the energization in the coil 30 is either such that the medium is affected mainly and to a considerably greater extent by the field between the pole pieces, or it can be made stronger in which event the recording magnetization of the medium takes place as the medium leaves pole piece 28.

The head of Figures 5 and 6 also embodies the complete magnetic return circuit, and as is the case with the head of Figures 2 and 3, all the pole pieces are on the same side of the recording medium during use.

Figure 9:
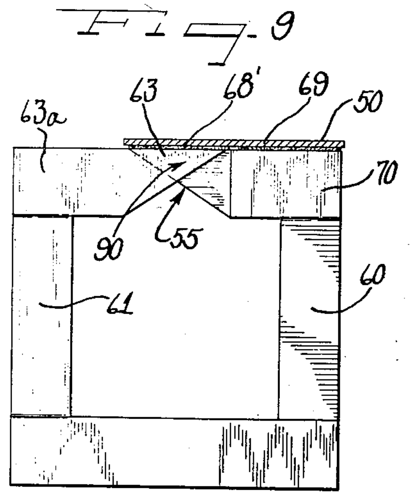
Figure 9 is a side elevational view of the head of Figure 7.
Figure 10:
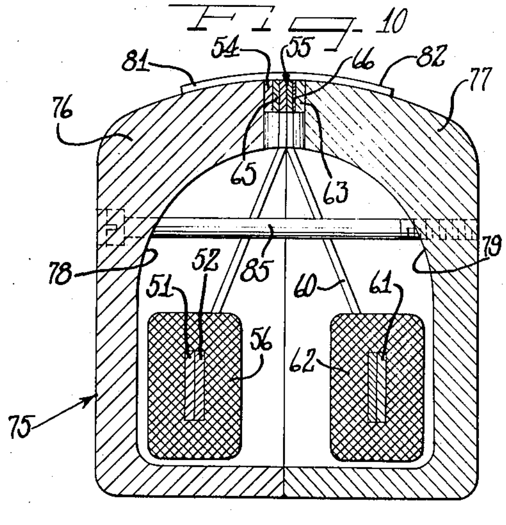
Figure 10 is a transverse sectional view of the head of Figure 7 disposed in a housing.

A combined erase-record-playback head is illustrated in Figures 7 through 10 and is designed for use with a multi-channel tape 50. The erase circuit is provided by a pair of core pieces 51 and 52 having overlapping pole pieces 54 and 55. As illustrated in Figure 10, the core pieces 51 and 52 are lapped within the erase coil 56 to provide a low reluctance juncture. The pole piece 55 is also part of the record-playback circuit and to this end may be of laminated construction, with one lamination providing the erase core piece 52 and the other lamination providing a record-playback core piece 60. A further record-playback core piece 61 may complete the record-playback circuit and be lapped with lamination 60 within record-playback coil 62.

The core piece 61 provides a pole piece 63 for overlapping with the common pole piece 55 but at the opposite side thereof from erase pole piece 54. The erase gap is thus defined by the spaced opposed overlapping lateral faces of pole pieces 54 and 55, and the record-playback gap is provided by the spaced opposed overlapping lateral faces of pole pieces 55 and 63. A spacer 65 for the erase gap may comprise a copper lamination having a thickness of 0.003 inch, and the record gap may be provided with an 0.0003 inch copper spacer 66. A further non-magnetic spacer 68, made for example, of copper or fiber, may be interposed between spacers 65 and 66 opposite the common pole piece 55. The core pieces may be built of one or more 0.015 inch mu metal laminations.

Where the tape 50 has a pair of channels 68' and 69, a pair of keeper strips 70 and 71 of low retentivity magnetic material may be provided, one on each side of the common pole piece 55. Further, the erase coil 56 is preferably connected so that pole piece 54 carries the high erase potential, while core portion 73 between the keepers 70 and 71 is substantially at zero potential. The core portion 73 under these circumstances has been found to act like a keeper. Core portion 73 may also act as a shield between the erase and record sections, coupling being reduced, if desired, by designing the cores with shorter legs 54*a* and 63*a*, so that the facing area between the legs represented by spacer 68 is reduced to a minimum. In such case the width of coils 56 and 62 would also be reduced.

As indicated in Figure 10 the combined erase-record-playback head may be mounted in a housing 75 comprising complementary parts 76 and 77 having interior cavities 78 and 79 for receiving the erase coil 56 and record-playback coil 62 and other parts of the head. The upper surface 81 of the housing is designed to receive the tape thereover, and the housing preferably provides a guide flange or flanges such as 82 for positioning the tape laterally. The housing parts are recessed at the top to permit the top surfaces of the pole pieces and the top surfaces of the keepers 70 and 71 and core portion 73 to lie flush with surface 81 of the housing. Suitable screws such as 85 may be employed to retain the housing parts in assembly. The flat surfaces of the spacers, keepers, and pole pieces are preferably glued together so that the head comprises a unitary compact structure for insertion into the housing.

Referring to Fig. 9, it will be observed that the pole pieces are so formed and arranged as to provide an essentially triangular overlap area 90. Since the tape travels adjacent the base of the overlap area, it will readily be appreciated that flux is concentrated in the region of the tape. The width of the base of the overlap area preferably corresponds to the width of the channel on the tape traveling thereover. The spacer members 65 and 66, being of conductive material, will likewise tend to concentrate the flux in the path of the tape.

Figure 13:
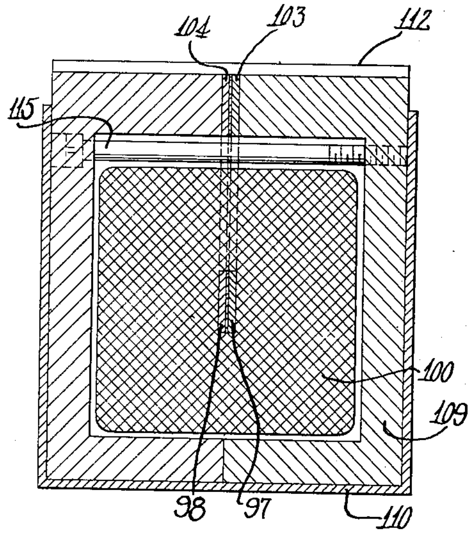
Figure 13 is a transverse sectional view of the head of Figure 11 mounted in a housing.
Figure 12:
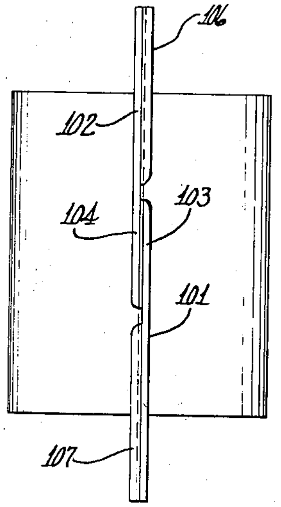
Figure 12 is a top plan view of the head of Figure 11.
Figure 11:
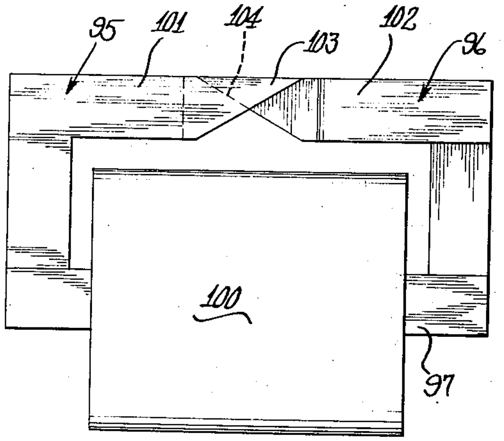
Figure 11 is a side elevational view of a single purpose head embodying features similar to the heads of Figure 7.

A single purpose head is illustrated in Figures 11, 12 and 13. The head may comprise confronting C-shaped core pieces 95 and 96 having lapped base legs 97 and 98 receiving in energizing coil 100. The opposite legs 101 and 102 provide overlapping pole portions 103, 104 which receive one channel of a multi-channel tape as in Figure 7. Keepers 106, 107 may be provided adjacent the legs 101, 102 of the core pieces to prevent cross effects between the channels. The housing may comprise a Bakelite body 109 with a mu metal shield 110 enclosing the same, and have guide flanges such as 112 for positioning the tape laterally as it travels over the head. Screws such as 115 may be employed to retain the housing in assembled relation.

Figure 14:
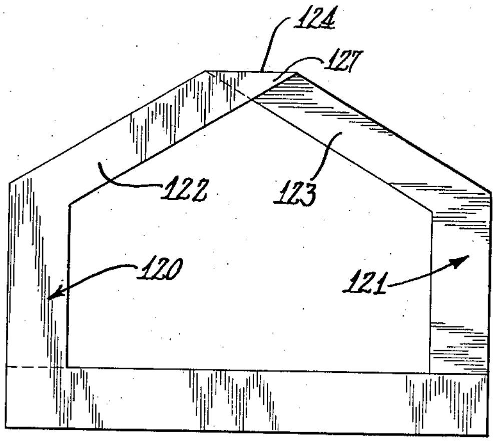
Figure 14 is a side elevational view similar to Figure 9, but showing a modified form of core structure, especially suitable for a single channel, or where a keeper is not to be used.

Figure 14 illustrates a modified head without the keeper feature, used for example, for a single channel tape, or for multiple channel use with separate keepers wherein the core pieces 120, 121 have obliquely extending upper legs 122, 123 whose free ends 124 lie in a single plane and receive the tape thereacross. Here again the area of overlap is in the form of an inverted triangle with the record member traveling over the base of the overlap area. A non-magnetic spacer member of conducting material is preferably interposed between the pole pieces 127 in order to further concentrate flux in the region of the record member.

One important advantage obtained by the triangular overlap provided in the heads of the present invention resides in the fact that the overlap area for a given width channel is minimized. For small erase gaps of less than 0.005 inch, there is a tendency for the erase head core to saturate. By shaping the pole pieces as illustrated in the drawings, with a minimum overlap area, the amount of flux required for efficient erasing is reduced and saturation is avoided. Further, in recording, the flux is concentrated in the region of the record member, so that a given signal will have a greater effect on the record member.

From the foregoing, it will be apparent that I have provided a head for a magnetic recorder that is of extremely economical construction, highly efficient, and one that does not require a source of high frequency alternating current for its proper functioning, but which will function under the source of high frequency alternating current if such is available. At the same time, I have shown an embodiment in Figures 2 and 3 which will operate under a source of direct current or under an alternating current of relatively lower common frequencies, and as an erase head will operate effectively in the form of a permanent magnet.

It will, of course, be understood that various details of construction may be varied through a wide range without departing from the principles of this invention and it is, therefore, not the purpose to limit the patent granted hereon otherwise necessitated by the scope of the appended claims.

I claim as my invention:

1. A combined erase-record-playback head comprising a core having a common pole piece and having a first core portion connected with said common pole piece and providing a part of an erase circuit and having a second core portion connected with said common pole piece and providing a part of a record-playback circuit, an erase pole piece extending in space overlapping relation to one lateral surface of said common pole piece and connected in the erase circuit with said first core portion, and a record-playback pole piece extending in spaced overlapping relation to the opposite lateral face of said common pole piece and connected in the record-playback circuit with said second core portion.

2. A demagnetizing head for a magnetic recorder, including a magnet arrangement having a plurality of pole pieces interdigitated with but spaced from a plurality of pole pieces of opposite polarity, the spacing between said pole pieces being progressively reduced from one end of the arrangement to the other, the path of a recording medium to be demagnetized being in proximity to said pole pieces.

3. A demagnetizing head for a magnetic recorder, including a magnet arrangement having a plurality of pole pieces interdigitated with but spaced from a plurality of pole pieces of opposite polarity, the spacing between said pole pieces being progressively reduced from one end of the arrangement to the other, said pole pieces each having a groove in the upper surface thereof which grooves define a guiding path for a recording medium.

4. In an erasing head for erasing a record from a ferromagnetic medium having a signal magnetically recorded thereon, a core of magnetic material having at least two gaps for successively receiving the medium thereacross, said gaps being of different size, and means utilizing interconnected magnetic circuits in said core for developing magnetic erasing fields across said gaps.

5. Magnetic apparatus comprising an erasing head for erasing a record from a ferromagnetic medium having a signal magnetically recorded thereon including a core of magnetic material having first and second gaps, means utilizing interconnected magnetic circuits in said core for developing across each gap a magnetic erasing field, and means for driving said medium through the fields of said first and second gaps in succession whereby said erasing fields act successively on each element of said medium to remove said signal therefrom, the second gap being larger than the first gap.

6. Magnetic apparatus comprising an erasing head for erasing a record from a ferromagnetic medium having a signal magnetically recorded thereon including a core of magnetic material having at least two gaps for successive coupling to said ferromagnetic medium, guide means defining a path for the medium extending successively past said gaps, and one of the gaps developing a relatively intense magnetic erasing field in said path and the other of said gaps developing a relatively less intense magnetic erasing field in said path, whereby the erasing fields acting on said medium are of different strengths.

7. In a magnetic apparatus, magnetic core means comprising at least three poles extending in laterally spaced laterally overlapping relation to define at least two non-magnetic gaps, with a first pole extending in one direction and with second poles extending in the opposite direction and disposed on respective opposite lateral sides of said first pole, said core means defining magnetic circuits each including one of said second poles and said first pole and the non-magnetic gap therebetween, for successive magnetic coupling to a magnetizable record medium traveling first over one of said second poles, then over said first pole and then over the other of said second poles.

8. In a magnetic apparatus, magnetic core means comprising at least three poles extending in laterally spaced laterally overlapping relation to define at least two non-magnetic gaps, with a first pole extending in one direction and with second poles extending in the opposite direction and disposed on respective laterally opposite sides of said first pole, said core means defining magnetic circuits each including one of said second poles and said first pole and the non-magnetic gap therebetween, each of said poles having an upper edge surface, and the upper edge surfaces of said pole all lying in a common surface, and a magnetizable record tape traveling parallel to said common surface first over the upper edge surface of one of said second poles, then over the upper edge surface of said first pole, and then over the upper edge surface of the other second pole for coupling the tape to the respective magnetic circuits in succession by means of the successive non-magnetic gaps.

9. In a magnetic apparatus, magnetic core means comprising at least three poles extending in laterally spaced laterally overlapping relation to define at least two non-magnetic gaps, with a first pole extending in one direction and with second poles extending in the opposite direction and disposed on respective opposite lateral sides of said first pole, said core means defining magnetic circuits each including one of said second poles and said first pole and the non-magnetic gap therebetween, and separate coil means linking each of said magnetic circuits.

10. In a magnetic apparatus, magnetic core means comprising at least three poles extending in laterally spaced laterally overlapping relation to define at least two non-magnetic gaps with a first pole extending in one direction and with second poles extending in the opposite direction disposed on respective laterally opposite sides of said first pole, said core means defining magnetic circuits each including one of said second poles and said first pole and the non-magnetic gap therebetween, said first pole having the portion thereof overlapping said second pole provided with an upper edge flush with the upper edges of said second poles to provide a record engaging surface, and said first pole having a further upper edge portion flush with said first mentioned upper edge portion thereof and providing a further record engaging surface for a plural channel magnetic record medium.

11. In a magnetic apparatus, magnetic core means comprising at least three poles extending in laterally spaced laterally overlapping relation to define at least two non-magnetic gaps, with a first pole extending in one direction and with second poles extending in the opposite direction and disposed on respective laterally opposite sides of said first pole, said core means defining magnetic circuits each including one of said second poles and said first pole and the non-magnetic gap therebetween, said first pole having the portion thereof overlapping said second poles provided with an upper edge flush with the upper edges of said second poles to provide a first record engaging surface, and said first pole having a further upper edge portion flush with said first mentioned upper edge portion thereof and providing a further record engaging surface for a plural channel magnetic record medium, and a magnetic keeper member carried by said first pole having an upper record member contacting edge flush with said further upper edge portion of said first pole.

12. In a magnetic apparatus, magnetic core means comprising at least three poles extending in laterally spaced laterally overlapping relation to define at least two non-magnetic gaps, with a first pole extending in one direction and with second poles extending in the opposite direction and on respective opposite lateral sides of said first pole, said core means defining magnetic circuits each including one of said second poles and said first pole and a non-magnetic gap therebetween, and separate coil means linking each of said magnetic circuits, one of said coils being an erase coil connected so that the second pole associated therewith carries the high erase magnetic potential while the first pole is at substantially zero magnetic potential.

13. A magnetic apparatus comprising a magnetic core providing a loop magnetic circuit and having oppositely extending laterally spaced laterally overlapping poles defining a non-magnetic gap with the poles having flush surfaces at the outer side of the loop circuit, and a magnetic tape record member having a channel thereof in contact with said flush surfaces at the region of overlap of said poles and having an adjacent channel riding on a surface of only one of said poles at a region spaced from the extremity of the other pole.

14. In a magnetic apparatus, magnetic core means comprising at least three poles extending in laterally spaced laterally overlapping relation to define at least two non-magnetic gaps, with a first pole extending in one direction and with second poles extending in the opposite direction, said core means defining magnetic circuits each including one of said second poles and said first pole and the non-magnetic gap therebetween, and a non-magnetic spacer opposite the extremity of said first pole and interposed between said second poles.

15. A head for cooperation with an elongated magnetizable record medium comprising a magnetic core of generally U-shape with spaced leg portions and a base portion magnetically connecting said leg portions, said core having magnetic pole pieces connected to the respective leg portions and extending inwardly from the respective leg portions into laterally offset laterally overlapping relationship, said laterally overlapping pole pieces extending transversely to the path of movement of said record medium to receive the record medium across a first one of said pole pieces and then across the gap between the pole pieces then across a further one of the pole pieces, means for establishing a first magnetic field extending from said first one of said pole pieces in the direction opposite to the direction of travel of the record medium, means for establishing a second magnetic field between the first one of said pole pieces and the further one of said pole pieces, and means for establishing a third magnetic field extending from said further one of said pole pieces in the direction in which the record medium travels, said first and third magnetic fields being of one polarity relative to the direction of travel of the record medium when the second magnetic field is of the opposite polarity so that successive increments of the record medium are subjected to a field of one polarity, then to a field of the reverse polarity and then again to a field of the one polarity.

16. A head for cooperation with an elongated magnetizable record medium comprising a magnetic core of generally U-shape with spaced leg portions and a base portion magnetically connecting said leg portions, said core having magnetic pole pieces connected to the respective leg portions and extending inwardly from the respective leg portions into laterally offset laterally overlapping relationship, said laterally overlapping pole pieces extending transversely to the path of movement of said record medium to receive the record medium across a first one of said pole pieces and then across the gap between the pole pieces then across a further one of the pole pieces, means for establishing a first magnetic field extending from said first one of said pole pieces in the direction opposite to the direction of travel of the record medium, means for establishing a second magnetic field between the first one of said pole pieces and the further one of said pole pieces, and means for establishing a third magnetic field extending from said further one of said pole pieces in the direction in which the record medium travels, said first and third magnetic fields being of one polarity relative to the direction of travel of the record medium and the second magnetic field being of the opposite polarity so that successive increments of the record medium are subjected to a field of one polarity, then to a field of the reverse polarity and then again to a field of the one polarity, the fields produced by said head being exclusively steady and non-fluctuating and of constant amplitude.

17. A head for cooperation with an elongated magnetizable record tape, comprising a magnetic core of generally U-shape with spaced leg portions and a base portion magnetically connecting said leg portions, said core having plate-like magnetic pole pieces connected to the respective leg portions and extending inwardly from the respective leg portions into laterally offset laterally overlapping relationship, said laterally overlapping plate-like pole pieces extending transversely to the path of movement of said record tape and having elongated flat planar upper edge faces lying flush in a common regular surface to receive the tape across the upper edge face of a first one of said pole pieces and then across the gap therebetween and then across the upper edge face of a further one of said pole pieces, means for establishing a first magnetic field in the path of travel of said tape and extending from said first one of said pole pieces in the direction opposite to the direction of travel of the tape, means for establishing a second magnetic field in the path of travel of said tape and extending between said first one of said pole pieces and said further one of said pole pieces, and means for establishing a third magnetic field in the path of travel of said tape and extending from said further one of said pole pieces in the direction in which the tape travels, said first and third magnetic fields being of one polarity relative to the direction of travel of the tape while the second magnetic field is of the opposite polarity so that successive increments of the tape are subjected to successively reversing magnetic fields as the tape travels across said pole pieces.

18. A head for cooperation with an elongated magnetizable record tape, comprising a magnetic core of generally U-shape with spaced leg portions and a base portion magnetically connecting said leg portions, said core having plate-like magnetic pole pieces connected to the respective leg portions and extending inwardly from the respective leg portions into laterally offset laterally overlapping relationship, said laterally overlapping plate-like pole pieces extending transversely to the path of movement of said record tape and having elongated flat planar upper edge faces lying flush in a common regular surface to receive the tape across the upper edge face of a first one of said pole pieces and then across the gap therebetween and then across the upper edge face of a further one of said pole pieces, means for establishing a first magnetic field in the path of travel of said tape and extending from said first one of said pole pieces in the direction opposite to the direction of travel of the tape, means for establishing a second magnetic field in the path of travel of said tape and extending between said first one of said pole pieces and said further one of said pole pieces, and means for establishing a third magnetic field in the path of travel of said tape and extending from said further one of said pole pieces in the direction in which the tape travels, said first and third magnetic fields being of one polarity relative to the direction of travel of the tape when the second magnetic field is of the opposite polarity so that successive increments of the tape are subjected to successively reversing magnetic fields as the tape travels across said pole pieces, said base portion comprising separate laterally overlapping parts connected to the respective legs.

19. Magnetic apparatus comprising guide means for defining a linear path for an elongated magnetic record medium and for laterally confining the record medium to a fixed lateral position as it travels longitudinally along said path, magnetic means for magnetic coupling to said magnetic record medium as it travels along said path including at least three pole members extending transversely of said path, said pole members each having at least one side surface extending transversely of and adjacent said path and overlapping and facing a side surface of an adjacent pole member to provide at least two gaps adjacent said path, and a magnetic record medium extending along said path and laterally confined by said guide means and having longitudinally spaced portions thereof magnetically coupled to said magnetic means at the respective gaps.

20. Magnetic apparatus comprising magnetic core means having at least three gaps across which a magnetic record medium successively travels, means for establishing successively oppositely directed magnetic fields at the gaps for successively acting on the record medium, and an elongated magnetic record medium extending across the successive gaps and having successive portions thereof under the influence of the respective fields.

21. Magnetic apparatus comprising guide means for defining a linear path for an elongated magnetic record medium and for laterally confining the record medium to a fixed lateral position as it travels longitudinally along said path, means for magnetic coupling to said magnetic record medium as it travels along said path including first means for establishing a first magnetic field extending into said path, second means for establishing a second magnetic field extending into said path, and third means for establishing a third magnetic field extending into said path, means for energizing said field establishing means for reducing the residual magnetization of a record medium traveling along said path, and a magnetic record medium extending along said path and confined by said guide means and having a first portion coupled to said first field establishing means and disposed in said first field and having a second portion coupled to said second field establishing means and disposed in said second field and having a third portion coupled to said third field establishing means and disposed in said third field.

22. A demagnetizing device for cooperation with an elongated magnetizable record medium comprising a demagnetizing head having a magnetic core, said core having a plurality of overlapping pole pieces extending transversely to the path of movement of said record medium to receive the record medium across a first one of said pole pieces and then across the gap between the pole pieces and then across a further one of said pole pieces, means for establishing a first magnetic field extending from said first one of said pole pieces in the direction opposite to the direction of travel of the record medium, means for establishing a second magnetic field between the first one of said pole pieces and the further one of said pole pieces, means for establishing a third magnetic field extending from said further one of said pole pieces in the direction in which the record medium travels, and lateral guides rigidly fixed relative to said head for confining the record medium against movement at right angles to the direction of movement of the record medium as the record medium travels across said pole pieces.

23. A magnetic apparatus comprising an attenuating head for reducing the residual magnetization of a record medium travelling thereacross, said attenuating head comprising a core of magnetic material having a plurality of pole portions defining a plurality of attenuating gaps, a record medium having an initial level of residual magnetization therealong for travel along a path extending successively across said gaps, means for establishing a magnetic attenuating field across each of said attenuating gaps, means whereby said attenuating fields successively act on the record medium to reduce the residual magnetization along the record medium to substantially zero, and means whereby at least one of said attenuating fields has a maximum intensity in said path less than that required to obliterate said initial level of magnetization.

24. A magnetic apparatus comprising an attenuating head having a plurality of pole portions of magnetic material for reducing the residual magnetization of a record medium travelling thereacross, a record medium having an initial level of residual magnetization therealong for travel along a path extending in operative relation to said pole portions, means comprising said pole portions for establishing a plurality of magnetic attenuating fields along said path for successive interaction with said record medium, means whereby said attenuating fields successively act on the record medium to reduce the residual magnetization along the record medium to substantially zero, and means whereby at least one of said attenuating fields has a maximum intensity in said path less than that required to obliterate said initial level of magnetization.

References Cited in the file of this patent

UNITED STATES PATENTS

| | | |
|---|---|---|
| 1,970,424 | Frink | Aug. 14, 1934 |
| 2,195,192 | Schuller | Mar. 26, 1940 |
| 2,277,305 | Cloplan | Mar. 24, 1942 |
| 2,316,928 | Woodward | Apr. 20, 1943 |
| 2,561,338 | Camras | July 24, 1951 |
| 2,655,462 | Clark | Oct. 13, 1953 |
| 2,702,835 | Camras | Feb. 22, 1955 |

FOREIGN PATENTS

| | | |
|---|---|---|
| 239,566 | Switzerland | Jan. 1, 1946 |